United States Patent [19]
Dan et al.

[11] Patent Number: 5,867,651
[45] Date of Patent: Feb. 2, 1999

[54] SYSTEM FOR PROVIDING CUSTOM FUNCTIONALITY TO CLIENT SYSTEMS BY REDIRECTING OF MESSAGES THROUGH A USER CONFIGURABLE FILTER NETWORK HAVING A PLURALITY OF PARTIALLY INTERCONNECTED FILTERS

[75] Inventors: Asit Dan, West Harrison; William H. Tetzlaff, Mount Kisco; Dinkar Sitaram, Yorktown Heights, all of N.Y.

[73] Assignee: International Business Machines Corporation, Armonk, N.Y.

[21] Appl. No.: 703,557

[22] Filed: Aug. 27, 1996

[51] Int. Cl.⁶ .............................. G06F 11/34; G06F 11/18
[52] U.S. Cl. ................................ 395/200.33; 395/200.68; 395/500; 395/187.01
[58] Field of Search ......................... 395/200.33, 200.68, 395/82.18, 187.01, 500, 601, 700

[56] References Cited

U.S. PATENT DOCUMENTS

| | | | |
|---|---|---|---|
| 5,440,726 | 8/1995 | Fuchs et al. ........................ | 395/82.18 |
| 5,457,797 | 10/1995 | Butterworth et al. ................ | 395/650 |
| 5,487,023 | 1/1996 | Seckora .............................. | 364/724.13 |
| 5,519,780 | 5/1996 | Woo et al. .............................. | 380/49 |
| 5,623,600 | 4/1997 | Ji et al. .............................. | 395/187.01 |
| 5,625,894 | 4/1997 | Jou ............................................ | 455/78 |
| 5,627,996 | 5/1997 | Bauer ..................................... | 395/500 |

*Primary Examiner*—Thomas C. Lee
*Assistant Examiner*—Rehana Perveen
*Attorney, Agent, or Firm*—Richard M. Ludwin, Esq.; Heslin & Rothenberg, P.C.

[57] ABSTRACT

The functionality of Web clients (e.g. browser) is enhanced using a WebFilter Manager (WFM) that allows i) easy integration of individual WebFilters operating on ingoing or outgoing messages between the browser and web servers, ii) arbitrary and dynamic ordering of WebFilters operating on a message stream, iii) splitting, combining, modifying and processing of message streams by WebFilters. The same methodology can also be applied in any client server environment for extending the functionality of the client or server.

13 Claims, 7 Drawing Sheets

SYSTEM FOR PROVIDING CUSTOM FUNCTIONALITY TO CLIENT SYSTEMS BY REDIRECTING OF MESSAGES THROUGH A USER CONFIGURABLE FILTER NETWORK HAVING A PLURALITY OF PARTIALLY INTERCONNECTED FILTERS

I. BACKGROUND OF THE INVENTION a. Field of the Invention

The present invention relates to Web browser systems.

b. Related Art

In a Web environment, Web clients retrieve data from Web servers using Web browsers. Examples of Web browsers include the IBM's WebExplorer and Netscape Navigator. The basic Web Browser operation includes fetching the data from a remote location specified by a Universal Resource Locator (URL) and operating on (e.g. displaying) the data based on the operational instructions provided by an operator or the server (e.g. MIME type or Java applet). The Web browsers provide standard functions e.g. displaying the Web data in different encoding formats and providing means of traversing Web links. A server can add functions to be executed on certain data by providing an applet (e.g. a Java applet) associated with the data.

A client may wish to add functionality to the browser irrespective of the MIME type or content of the data. Conventional Web browser plug-ins are not suitable for such a purpose because operations are typically tied to the MIME type or content of the imported data. Examples of functions not tied to the content of the data would be where a client wishes to have the web browser log the data or check for viruses for a particular time period. This is in contrast, for example, of allowing the data to be imported and then doing logging or a virus check by a separate process.

A client may also wish to have the browser perform multiple, inter-related processing steps. This ability is not typically available in conventional web browsers since there is no mechanism to maintain persistent state information across multiple web operations performed by different applets.

On way to provide a client with enhanced functionality not tied to MIME or content type would be to use a sequence of proxy-servers with hard coded functionalities (e.g., caching, firewall protection). However, dynamically modifying the functionalities of such proxy-servers is a difficult task.

II. SUMMARY OF THE INVENTION

In view of the forgoing, there is a need to provide users with a mechanism through which content independent functionality can be provided to web clients. There is also a need to provide web browsers with a mechanism to maintain persistent state information across multiple web operations performed by different applets.

In accordance with a first aspect of the present invention a computer program product embodied on a computer readable medium is provided for filtering of messages between a client process and a server process. The computer program product includes a filter having at least one filter program code module for executing a filter process and having an input and output and a flow control program code module including code for redirecting messages flowing between the client process and the server process to the input and for directing messages from the output to a predetermined program process.

In accordance with another aspect of the present invention a system and method for providing a web browser with added functionality are provided. In accordance with the method a filter network having at least one filter implementing at least a portion of a desired functionality is provided. Messages flowing between the web browser and a web server are redirected to the input of the filter network. Further output messages from the filter network are redirected to a user selected destination.

In accordance with an embodiment of the present invention a the functionality of Web clients (e.g. browser) is enhanced using a WebFilter Manager (WFM) that allows i) easy integration of individual WebFilters operating on ingoing or outgoing messages between the browser and web servers, ii) arbitrary and dynamic ordering of WebFilters operating on a message stream, iii) splitting, combining, modifying and processing of message streams by WebFilters. The same methodology can also be applied in any client server environment for extending the functionality of the client or server.

III. BRIEF DESCRIPTION OF THE DRAWINGS

IV. DETAILED DESCRIPTION OF A PREFERRED EMBODIMENT

Figure 1:
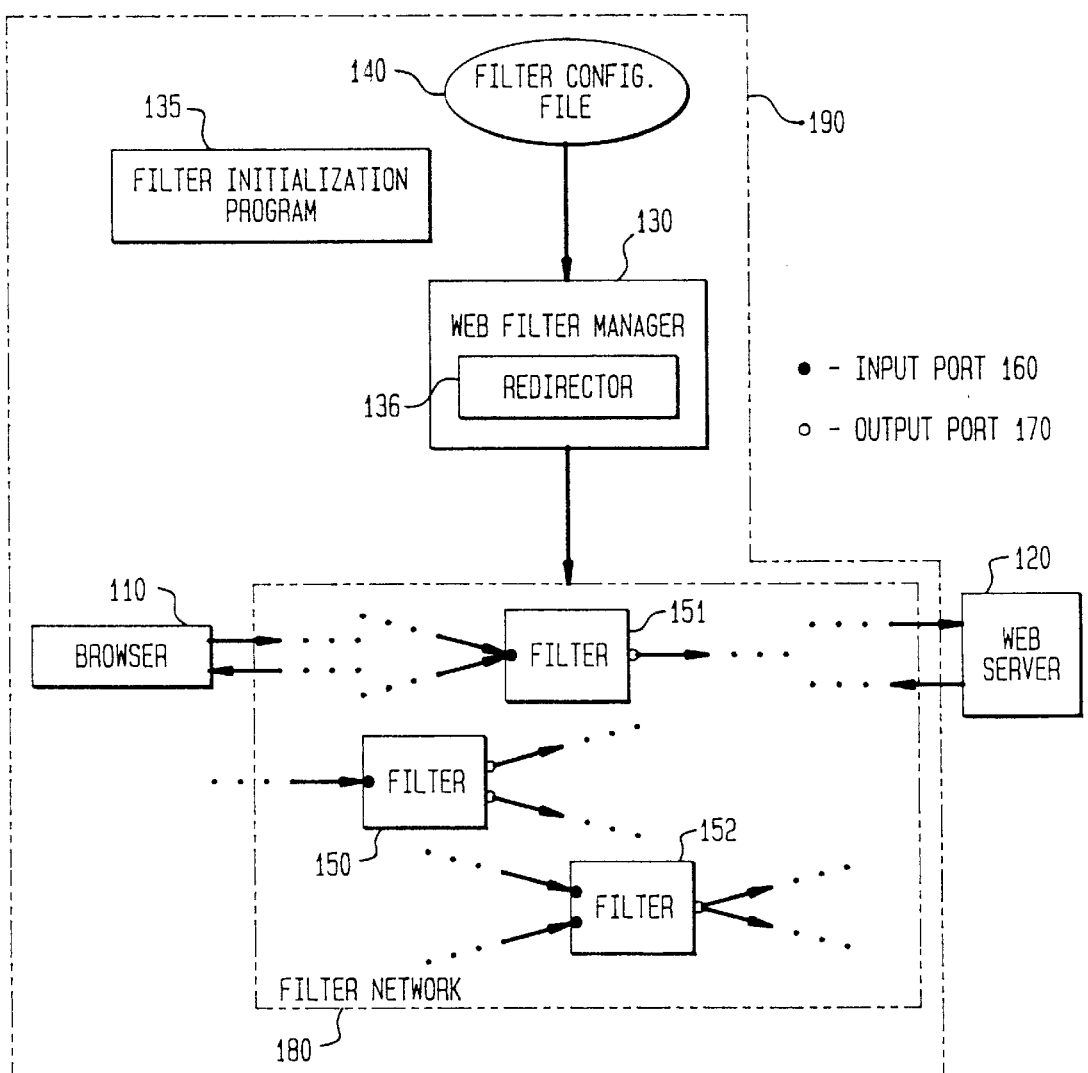
FIG. 1 is a block diagram of a WWW system according to an embodiment of the present invention.

FIG. 1 is a block diagram of a WWW browser/server system according to an embodiment of the present invention. The Browser 110 is a unmodified WWW browser (such as IBM's WebExplorer or Netscape Navigator) that may be used to access data from a Web Server 120. Messages passing between the Browser 110 and the Web Server 120 are processed by the Filter Network 180 which provides additional functionality not provided in the Browser 110. The WWW browser and the Web Server communicate over a conventional communication network (not shown) using a conventional protocol such as HTTP over TCP/IP.

The Filter System 180 includes an interconnected set of Filters (150,151,152). As used herein, a Filter is an application program that (i) reads data from one or more Input Ports 160 (ii) processes the data and (iii) and then writes data to one or more Output Ports 170. The application can instantiated as a separate operating system process or thread, or as a subroutine call from the Web Filter Manager (WFM) 130. By convention, a unique identification number is assigned to each Input Port 160 or Output Port 170 of a Filter.

The Output Port 170 of a Filter 150 can be connected to an Input Port 160 of another Filter 150 or to one of its own Input Ports 160. In this case, the Web Filter Manager 130 ensures that any data written to the Output Port 170 of the first Filter 150 is made available for reading at the Input Port 160 of the second Filter 150. An Input Port 160 may be connected to multiple Output Ports 170 (as shown in Filter 151). In this case, the data written on any of the multiple connected Output Ports 170 is made available to the single Input Port 160 in the order of the writing of the data. Similarly, a single Output Port 170 may be connected to multiple Input Ports 160 (as shown in Filter 152), in which case copies of any data written to the single Output Port 170 are made available for reading to all the connected Input Ports 160.

The Filter Network 180 is managed by the Web Filter Manager 130. The Web Filter Manager 130 reads the definitions of the available filters and their interconnections from the Filter Configuration File 140. Each time a new connection request flows between the Browser 110 and Web Server 120, it initializes a new set of Filters 150 and interconnects the Input Ports 160 and Output Ports 170 as specified. For initializing the Filters 150, the Web Filter Manager 130 invokes the Filter Initialization Program 135 as will described later. After the new Filter Network 180 has been initialized, it can provide additional functionality to the Browser 110 by processing messages flowing between the Browser 110 and the Web Server 120. The Web Filter Manager 130 includes a Redirector process 136 which intercepts messages flowing between the Browser and the Server. Interception of messages between the Browser and the Server can be accomplished by modifying the operating system of the client computer system 190 to send all requests from the Browser 110 and the Server 120 to the Redirector 136.

The filter Initialization Program 135, the Web Filter Manager 130, the Browser 110 and the filters are all preferably embodied as program code executing on a client computer system 190 (e.g. an IBM Personal Computer or RISC Workstation). The Filter Configuration File 140 and the various data structures generated and used by the Web Filter Manager 130 are stored in the memory of the computer system.

Figure 2:
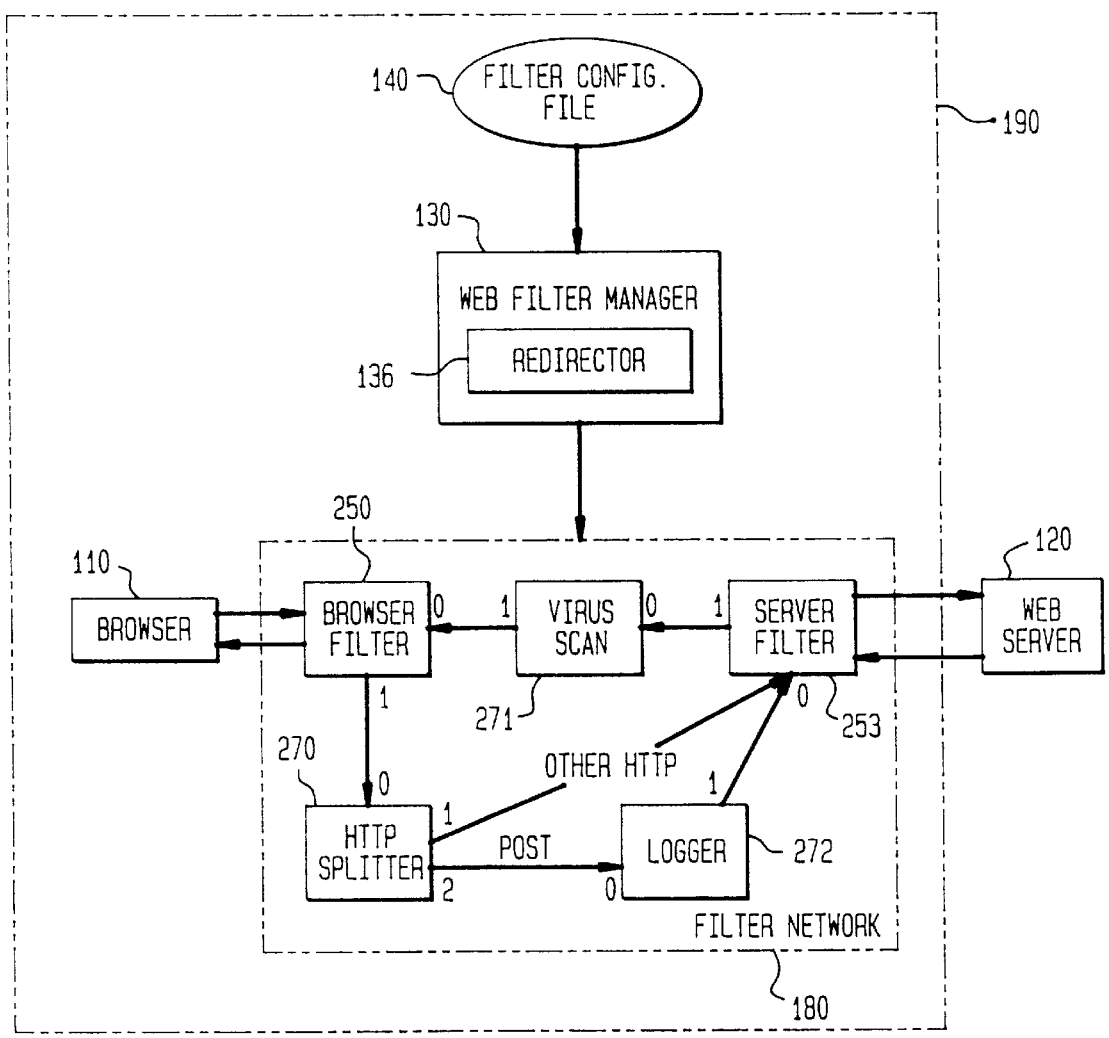
FIG. 2 is a block diagram of a WWW system according to an embodiment of the present invention with an example of a Filter Network.

FIG. 2 contains an illustrative configuration containing a Filter Network 180 that provides the two following additional functions to the Browser 110: (i) logging of all POST requests generated by the Browser 110 (which are normally requests to the server to perform some update, unlike other HTTP requests which are normally read-only) and (ii) scanning of incoming Java applets for viruses. This is accomplished by the Filter Network 180 as follows. Outgoing messages from the Browser 110 are intercepted by the Browser Filter 250 which writes these messages to its Output Port number 1 (for convenience, the Input Ports 160 and Output Ports 170 are not explicitly shown in the figure. However, each arrow between Filters has its tail at an Output Port 170 and its head at an Input Port 160). These messages are read by the HTTP Splitter filter 270 on its Input Port 0. The HTTP Splitter 270 writes all POST messages to its Output Port 2, which is connected to the Input Port 0 of the Logger filter 272. The Logger filter 272 logs the POST messages and writes the messages on its Output Port 1 which is connected to Input Port 0 of the Server Filter 253. Messages other than POST messages are written by the HTTP Splitter 270 to its Output Port 1 which is directly connected to Input Port 0 of the Server Filter 253. The Server Filter 253 reads all messages written to its Input Port 0 and relays them to the Web Server 120. The Server Filter 253 also intercepts all incoming messages from the Web Server 120 and writes them to its Output Port 1 which is connected to Input Port 0 of the Virus Scan filter 271. The Virus Scan filter 271 examines the message and writes the message to its Output Port 1 if the message is not a Java applet or is a virus-free Java applet. These messages are read by the Browser Filter 250 on its Input Port 0 and delivered to the Browser 110.

Table 1 (below) shows a pseudocode embodiment for the Virus Scan filter 271 of FIG. 2. In the step labeled "VIRUSSCAN", the filter reads a block of input data. It then invokes the function "VIRUS_SIGNATURE_CHECK" to check the input data for the signature of a virus. If a signature is found, the filter writes an error message to PORT1; otherwise, it copies the input data to PORT1. In the final step, the Virus Scan filter checks to see of there is more data. If there is, it goes to the step labeled "VIRUSSCAN". Otherwise, the filter enters an idle state until more data arrives.

TABLE 1

Virus Scan Filter

Figure 3:
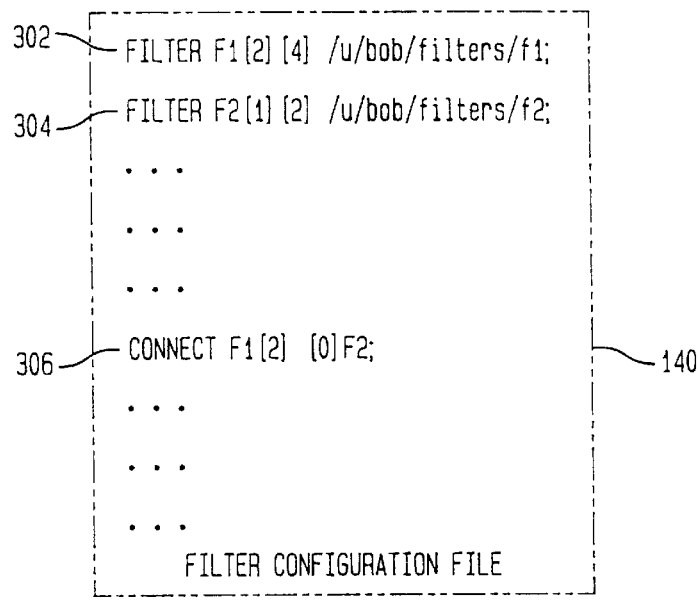
FIG. 3 shows the Filter Configuration File.

VIRUSSCAN: READ INPUT_DATA FROM PORT0;
IF VIRUS_SIGNATURE_CHECK (INPUT_DATA)
  WRITE ERROR_MESSAGE TO PORT1;
ELSE
  WRITE INPUT_DATA TO PORT1;
IF MORE_DATA GOTO VIRUSSCAN;

FIG. 3 shows the Filter Configuration File 140, which contains two types of statements—Filter Definition Statements 302, 304 or Filter Connection Statements 306. Examples of both types of statements are shown in FIG. 3. Filter Definition Statements 302, 304 start with the keyword "Filter" and are followed by the name of the filter, the number of input and output ports enclosed in square brackets, and the full path name of the program that implements the filter. Filter Connection Statements 306 include the keyword "Connect" followed by the name of the filter producing the output, the output port number enclosed in square brackets, the input port number enclosed in square brackets and the name of the filter receiving the input. Both types of statements are terminated by semicolons.

In the examples shown in FIG. 3, Filter Definition statement 302 defines a filter called F1 with two input ports (port numbers 0 and 1) and four output ports (port numbers 2 through 5). Filter F1 is implemented by a program identified by the path /u/bob/filters/f1. Similarly, Filter definition statement 304 defines a filter called F2 with one input port (port 0) and two output ports (ports 1 and 2). Filter F2 is implemented by the program /u/bob/filter/f2. The Filter Connection statement 306 directs that output port 2 of filter F1 is to be connected to input port 0 of filter F2 (i.e. the output from the program f1 is to be provided as an input into program f2).

TABLE 2

Redirector

WAITCONN: WAIT_FOR_CONNECTION (CONN_REQUEST);
CLIENT_NAME = EXTRACT_CLIENT_NAME
  (CONN_REQUEST);
SERVER_NAME = EXTRACT_SERVER_NAME
  (CONN_REQUEST);
RC = SEND_CONNECTION_REQUEST (SERVER_NAME,
  SERVER_PORT);
IF (RC==ERROR)
  SEND_ERROR_MESSAGE (RC, CLIENT_NAME);
ELSE
  {
  CLIENT_PORT = REQUEST_PORT(CLIENT_NAME);
  SEND_CONFIRMATION (CLIENT_NAME, CLIENT_PORT);

TABLE 2-continued

Redirector

```
NOTIFY_FILTER_MANAGER (CLIENT_PORT,
   SERVER_PORT);
}
GO TO WAITCONN;
```

Table 2 shows a pseudocode embodiment for the Redirector 136. The Redirector 136 redirects the program inputs and outputs to, from and within the filter network 180 of the present invention. The Redirector 136 first executes step labelled "WAITCONN" where it invokes the procedure "WAIT_FOR_CONNECTION". This intercepts connection requests from the Browser 110 to the Web Server 120 and returns the request in "CONN_REQUEST". The Redirector 136 next extracts from "CONN_REQUEST" the name of the client and server into "CLIENT_NAME" and "SERVER_NAME", respectively, using procedures "EXTRACT_CLIENT_NAME" and "EXTRACT_SERVER_NAME", respectively. The Redirector 136 next sends a connection request to the server specified in "SERVER_NAME" and receives in response a return code "RC" and a server port for communication with the server in "SERVER_PORT". Next, the Redirector 136 examines the return code in "RC". If "RC" indicates an error, the Redirector 136 invokes the procedure "SEND_ERROR_MESSAGE" which notifies the client Browser 110 that the server is unavailable. Otherwise, it invokes the system function "REQUEST_PORT" to request a port for communication with the Browser 110 and stores the port in "CLIENT_PORT". The Redirector 136 then sends a confirmation message and the client port to the Browser 110 by invoking the procedure "SEND_CONFIRMATION". Next, the Redirector 136 uses the procedure "NOTIFY_FILTER_MANAGER" to notify the Web Filter Manager 130 of the client and server ports. Finally, the Redirector 136 re-executes the step labelled "WAITCONN".

Figure 4:
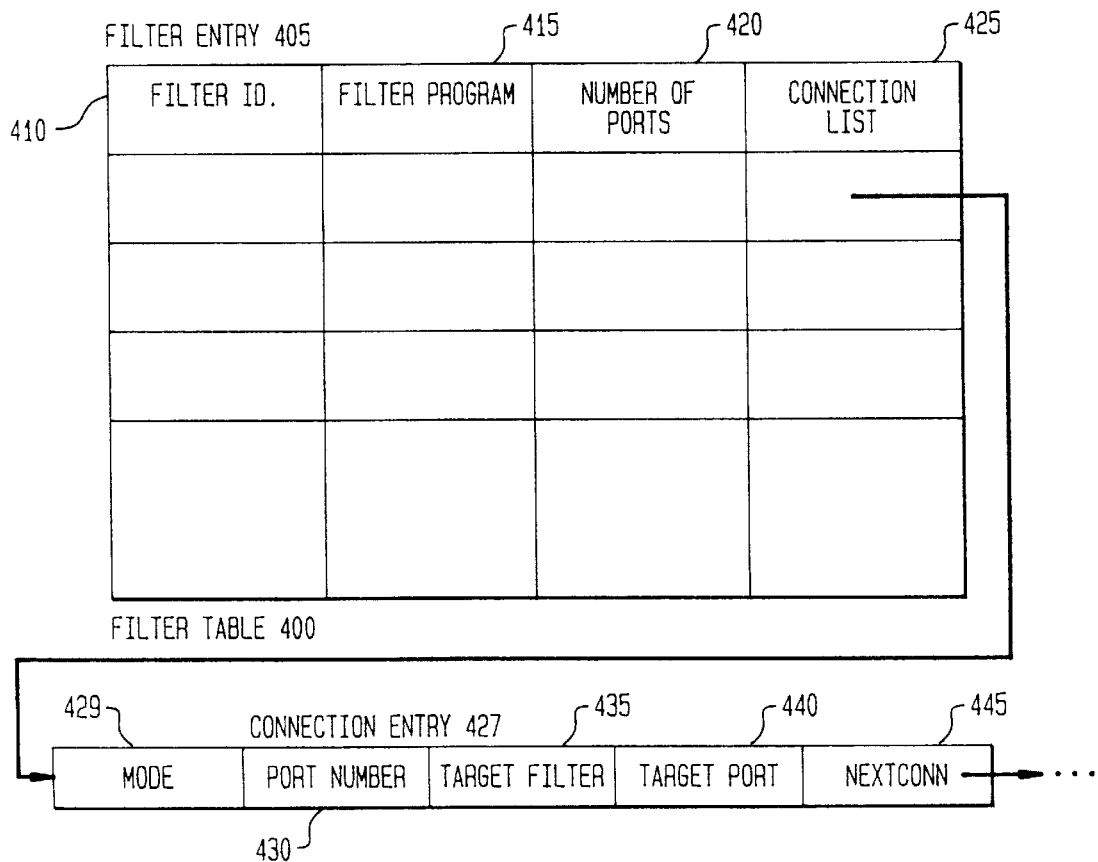
FIG. 4 shows the Filter Table.

FIG. 4 shows the Filter Table 400 used by the Filter Manager 130 to store information about filters. The Filter Table 400 includes a number of Filter Entries 405, one for each filter. The Filter Entry 405 includes the Filter Id. 410, the name of the program that implements the filter (Filter Program 415), the Number of Ports 420 on the filter and the Connection List 425 that keeps track of all the filters this filter is connected to. The Connection List 425 contains a list of Connection Entries 427, one for each connection. The Connection Entry 427 contains the Port Number 430 of this filter that constitutes one end of the connection, the Mode 429 of the connection (set to READ or WRITE if the Port Number 430 is an Input Port or an Output Port, respectively), the name of the Target Filter 435 and the Target Port 440 that constitutes the other end, and a pointer NextConn 445 that points to the next Connection Entry 427 on the Connection List 425. The Filter Table 400 is maintained in shared storage so that it can be accessed by the Filter Initialization Processes (as described below).

Figure 5:
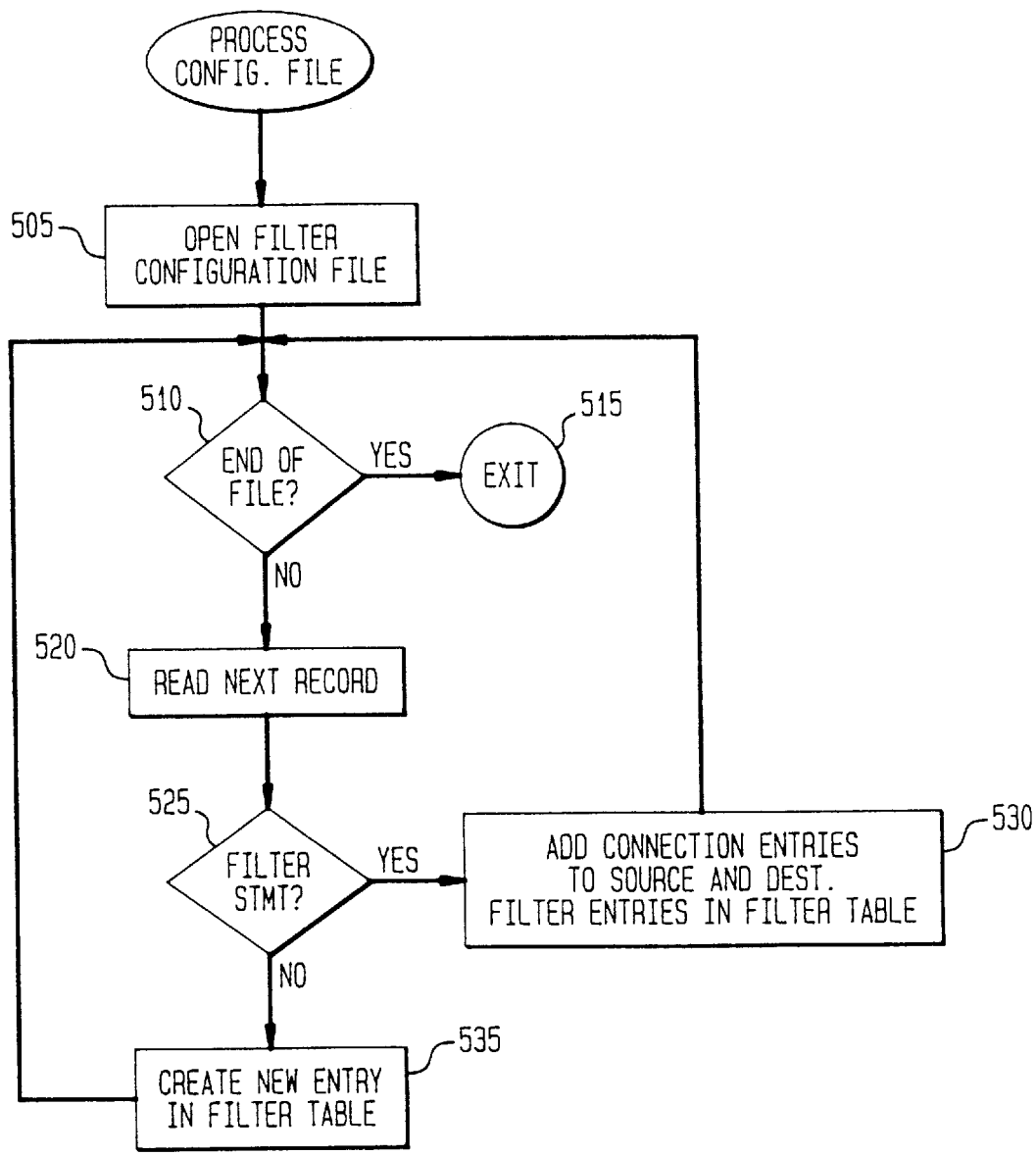
FIG. 5 shows the processing of the Filter Configuration File by the Filter Manager.

FIG. 5 shows the procedure used by the Filter Manager 130 to read in the Filter Configuration File (FCF) 300 and generate the Filter Table 400. This happens during and initialization and whenever the FCF 300 is updated. In step 505, the Filter Manager 130 opens the FCF 300. In step 510 it checks to see if it has reached the end of the FCF 300; if so, it exits in step 515. Otherwise, it reads in the next record from the FCF 300 and in step 525 checks to see if it is a Filter Definition Statement 310. If so, it creates a new Filter Entry 405 in the Filter Table 400, initializes the fields in the Filter Entry 405 from the Filter Definition Statement 310 and sets the Connection List 425 to NULL to indicate that at present there are no connections. It then proceeds to step 510. If the test in step 525 indicates that the statement is a Filter Connection Statement 420, the Filter Manager 130 proceeds to step 520 where it adds Connection Entries 427 to the Connection List 425 of the Filter Entries 405 for both the source and destination filters. It then proceeds to step 510.

Figure 6:
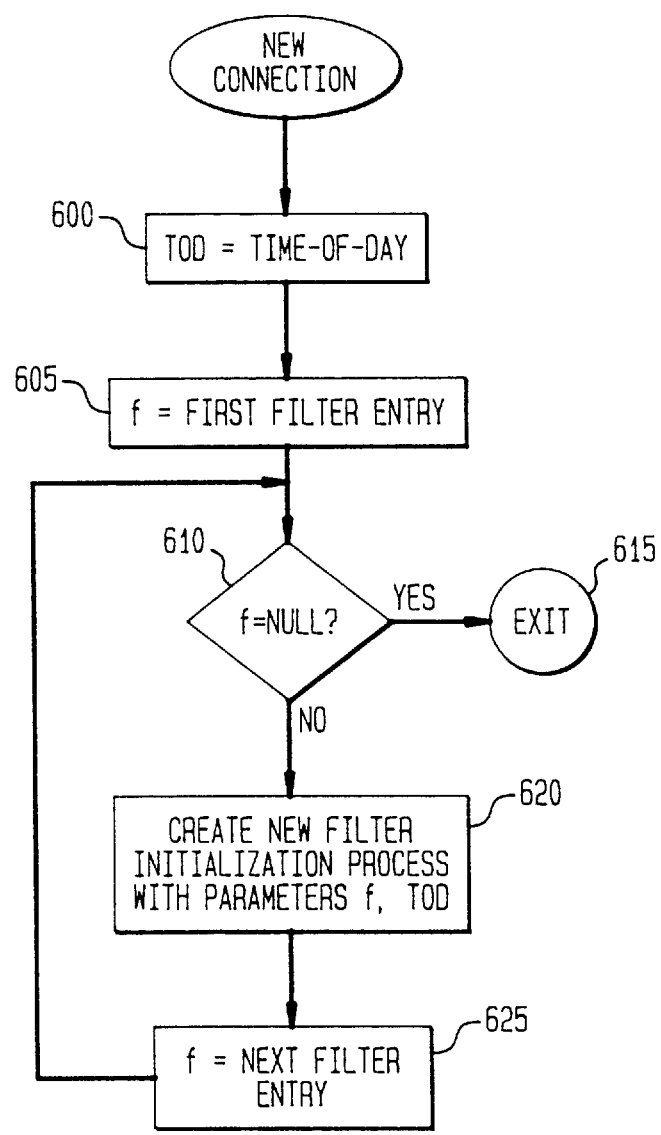
FIG. 6 shows the handling of a new connection request by the Filter Manager.

FIG. 6 describes the processing performed by the Filter Manager 130 when a new connection is made between the browser and the web server. In step 600, the Filter Manager 130 records the current time in the variable TOD. In step 605, the Filter Manager 130 sets the variable f to point to the first Filter Entry 405 in the Filter Table 400. In step 610, the Filter Manager 130 checks if f is NULL. If it is, the Filter Manager 130 exits in step 615. If f is not NULL in step 610, the Filter Manager 130 executes step 620 where it creates a new Filter Initialization Process by running the Filter Initialization Program 135 with two parameters (1) the Filter Id of f and (2) TOD. In step 625, the Filter Manager 130 then sets f to the next Filter Entry 405 in the Filter Table 400 and then executes step 610.

Figure 7:
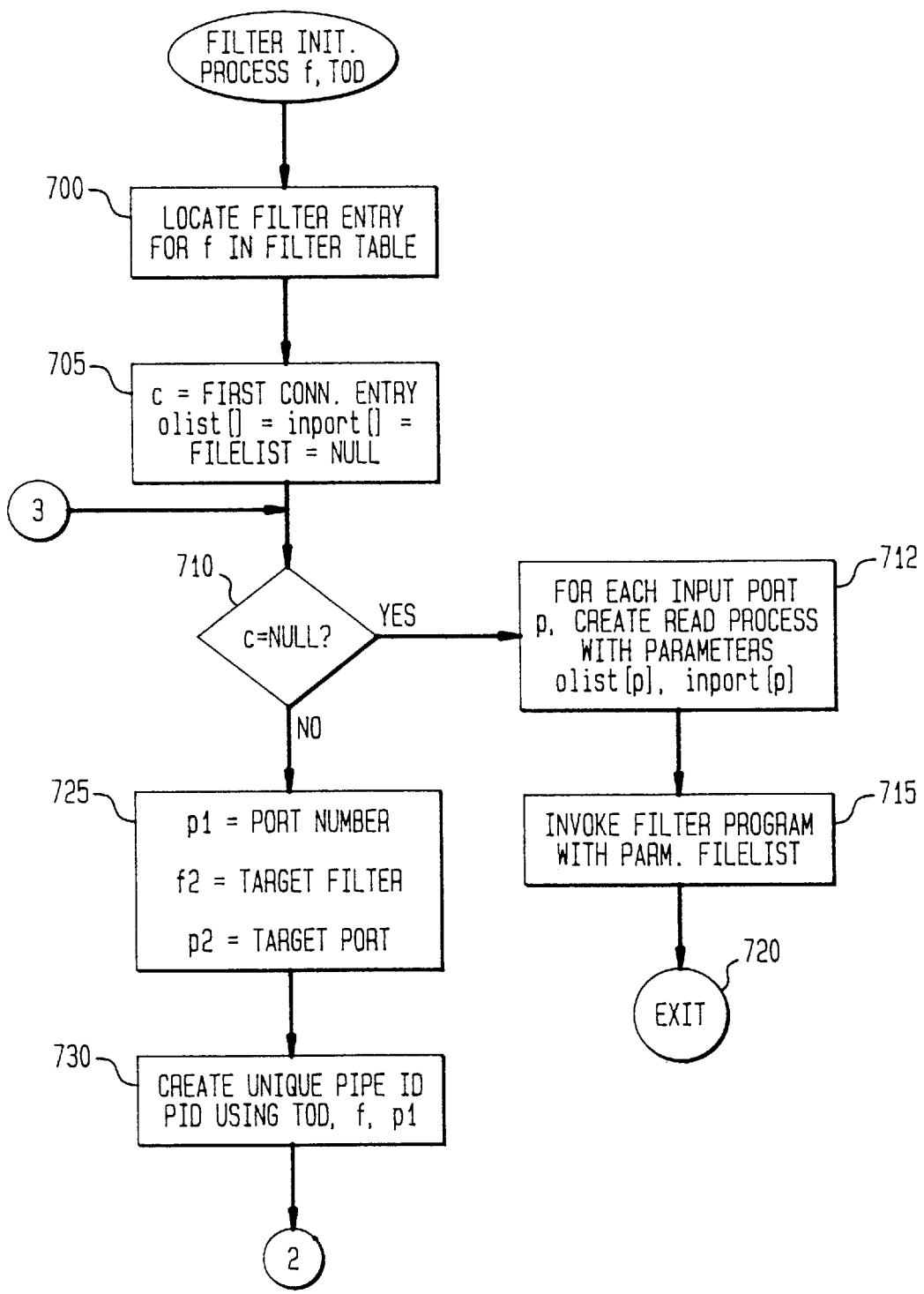
FIGS. 7 and 8 show the processing performed by the Filter Initialization Program.
Figure 8:
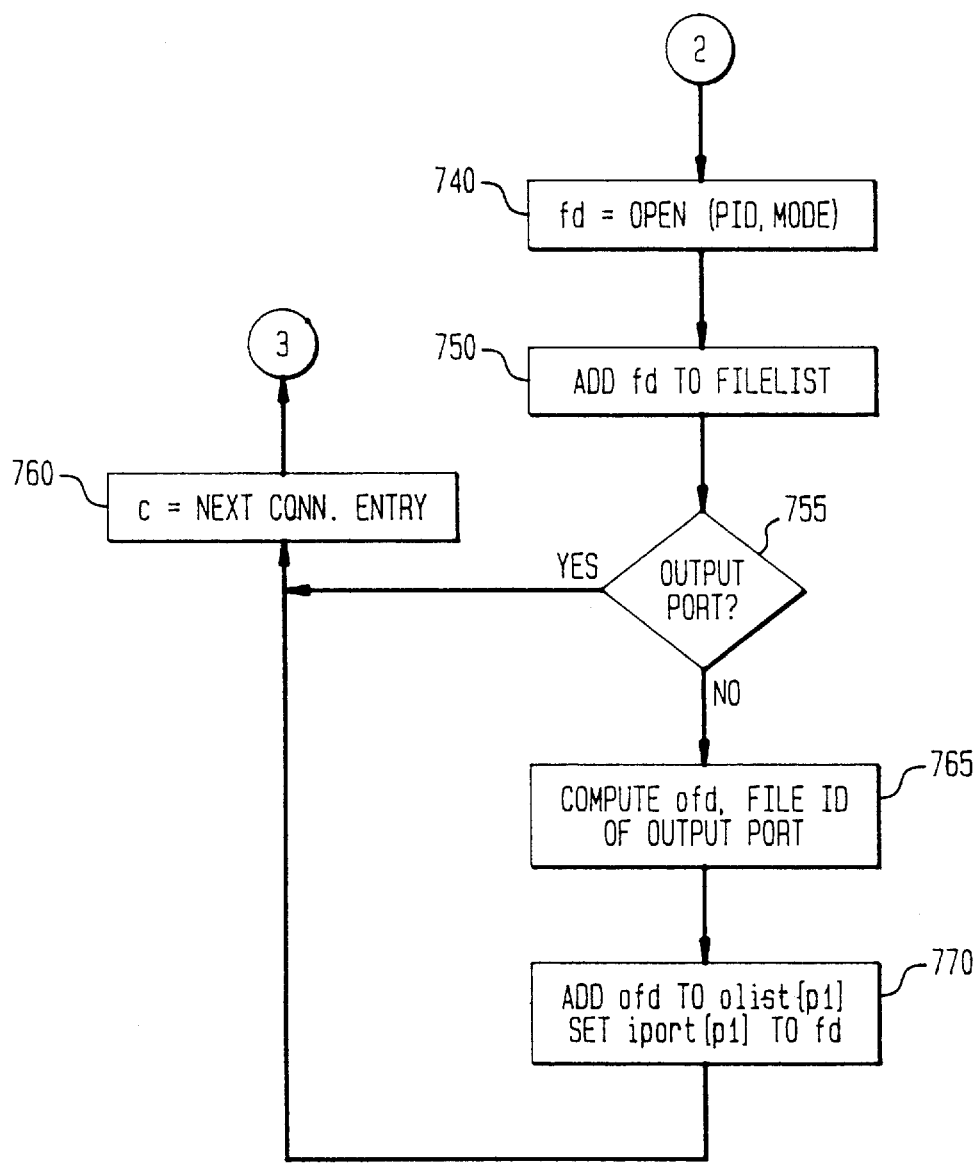

FIGS. 7 and 8 show the processing performed by each Filter Initialization Program 135. In step 700, the Filter Initialization Program (FIP) 135 locates the Filter Entry 405 in the Filter Table 400 for the Filter Id passed in as a parameter. In step 705, it sets the local variable c to point to the first Connection Entry in the Connection List and sets the each element of the array variable olist (which is an array of lists indexed by the port number) to NULL, each element of the array inport (which is indexed by the port number) to NULL, and the list fileList to NULL. In step 710, the FIP 135 checks if c is NULL. If it is, in step 712 the FIP 135 for each input port creates a read process with parameters olist [p] and inport [p]. The read process reads in parallel the files olist[p] and writes the data to the single file inport[p].

Next, in step 715 the FIP invokes the Filter Program with the list of file handles in the variable fileList as a parameter and exits in step 720. If c is no NULL in step 710, in step 725 the FIP 135 sets variables p1 to the Port Number from the Connection Entry c, f2 to the name of the Target Filter from the Connection Entry c, and p2 to the Target Port from the Connection Entry c. In step 730, the FIP 135 creates a unique file id from the variables TOD, f, p1. For example file id can be set as the string f.p1.TOD.

In step 740 the FIP 135 opens the file with the appropriate Mode. In step 750, the file handle returned from the open (stored in variable fd) is added to fileList. The FIP 135 then checks in step 755 if the port is an output port. If yes, in step 760, the FIP 135 sets c to point to the next Connection Entry in the Connection List and executes step 710. If the test in step 755 indicates the port is a read port, the FIP 135 in step 765 computes in ofd the unique name of the output port the read port is connected to. Next, in step 770 the FIP 135 adds ofd to olist[p1] and sets inport[p1] to fd and executes step 760.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method of providing a web browser with added functionality, comprising the steps of:

a) providing a configurable filter network having an input, an output, and a plurality of at least partially interconnectable filters, each filter implementing at least a portion of a respective desired function, the functions and interconnections of the filter network configured according to a user provided configuration data structure;

b) redirecting messages flowing between the web browser and a web server to the input; and, c) redirecting output messages from the filter network to an input of a predetermined application.

2. The method of claim 1 wherein the filter network comprises a plurality of inputs and a plurality of outputs and wherein the redirecting comprises the further step of redirecting at least some output messages from the filter network to the web server.

3. The method of claim 1 wherein the filter network comprises a plurality of inputs and a plurality of outputs and wherein the redirecting comprises the further step of redirecting at least some output messages from the filter network to a process other than the web server and the web browser.

4. The method of claim 1 wherein at least one filter of the plurality of filters comprises a virus scanning application and wherein messages enroute to the web browser are scanned for viruses prior to being delivered to the web browser.

5. The method of claim 1 wherein at least one filter of the plurality of filters comprises a logging application and wherein messages flowing between the web browser and the web server are logged in accordance with a user specified criteria prior to being delivered to their destination.

6. A computer program product embodied on a computer readable medium for providing filtering of messages between a client process and a server process, comprising:

a configurable filter network comprising an input, an output, and a plurality of at least partially interconnectable filter program code modules, each module for executing a respective filter process, the filter processes and interconnections of the filter network configured according to a user provided configuration data structure; and a flow control program code module comprising code for redirecting messages flowing between the client process and the server process to the input and for directing messages from the output to a predetermined process.

7. The computer program product of claim 6 wherein at least one filter program code module of the plurality of filter program code modules comprises a virus scanning applet for scanning messages enroute to the predetermined process prior to delivering the messages to the predetermined program process.

8. The computer program product of claim 6 wherein at least one filter program code module of the plurality of filter program code modules comprises a logging application for logging messages flowing between the client process and the server process in accordance with a user specified criteria prior to being delivered to their destination.

9. The computer program product of claim 6 wherein the predetermined process is the server process.

10. The computer program product of claim 6 wherein the predetermined process is the client process.

11. The computer program product of claim 6 wherein the predetermined process is another filter program module.

12. The computer program product of claim 6 wherein the filter program code module comprises a transaction monitor that stores information indicative of previous activities associated with at least one transaction.

13. The computer program product of claim 12 wherein the transaction monitor initiates rollback messages upon receiving an indication of a failure of a transaction.

* * * * *